Oct. 20, 1942.  J. C. CANTLEY  2,299,126
GRINDING MACHINE
Filed Aug. 1, 1940
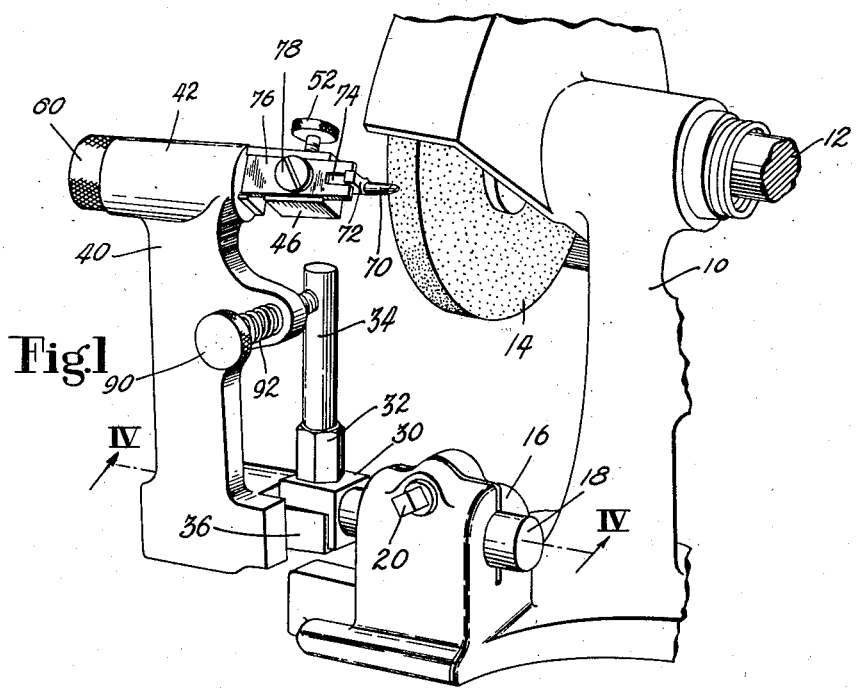
Fig.1
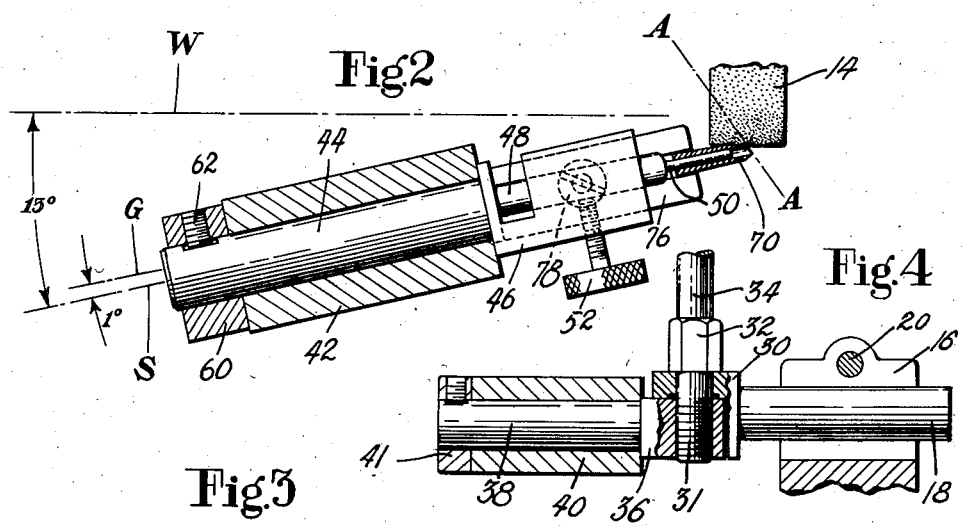
Fig.2
Fig.4
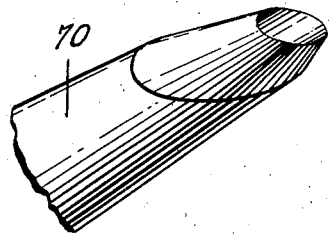
Fig.3
INVENTOR
Joseph C. Cantley
By his Attorney
Victor Cobb.

Patented Oct. 20, 1942

2,299,126

UNITED STATES PATENT OFFICE 2,299,126

GRINDING MACHINE

Joseph C. Cantley, Beverly, Mass., assignor to United Shoe Machinery Corporation, Flemington, N. J., a corporation of New Jersey Application August 1, 1940, Serial No. 349,181

2 Claims. (Cl. 51—105)

This invention relates to a machine for grinding an oblique cutting edge on a hollow conical tool and is particularly adapted for grinding grooving tools such as those used in connection with the channeling of the soles of shoes. A machine for this work, and employing a grooving tool (in addition to a channeling knife) is shown in United States Letters Patent No. 2,084,348, granted June 22, 1937, on an application of N. H. Knowlton.

Such grooving tools should be ground with the cutting edge oblique to their axes in order to operate properly. Groovers of this general type have, heretofore, been ground free-hand and it is an object of the present invention to provide a grinding machine for this work in which the tool may be readily positioned and more accurately ground without the use of skilled labor.

A feature of the invention consists in a mounting for a grooving tool which comprises a spindle that fits the inside bore of the tool and which may be revolved with the tool about an axis on whilch a holder for the spindle is rotated while the tool is in contact with an operating surface of a grinding wheel. This axis is inclined at an acute angle to the operating surface of the wheel to produce a beveled grind on the end of the grooving tool and, in order to have the cutting edge inclined to the axis of the grooving tool, the axis of the spindle and tool is offset at a slight angle to the axis about which the spindle holder revolves, so as to cause the grooving tool to revolve in a closed orbital path while in grinding contact with the grinding wheel to grind a bevel of varying angle and length around the perimeter of the cutting edge.

In the drawing,

Fig. 1 is a perspective view of a portion of a grinding machine constructed in accordance with the present invention;

Fig. 2 is a detail, partly in section, of the mechanism for mounting and revolving the grooving tool in contact with the grinding wheel and illustrates, diagrammatically, the relation of the geometric axis of the tool and spindle to their axis of revolution, and also to the axis of the grinding wheel;

Fig. 3 is a view showing the end of the grooving tool after it has been ground by the machine of the present invention; and Fig. 4 shows, in section, details of the arrangement and mounting of certain of the parts.

A portion of the frame of a grinding machine is indicated at 10. This frame carries a shaft 12 on which is mounted a grinding wheel 14 for sharpening the grooving tool. The frame is provided with a split bearing 16 in which is adustably mounted a rod 18, parallel to the shaft 12 and held in position by a clamp screw 20. Integral with the outer end of the rod 18 is a block 30 having an upright bore through which passes a bolt 31 having a head 32 extending above which, and integral therewith, is a stop stud 34. Clamped beneath the block 30 by the bolt 31 is another block 36 from which extends a round shank 38 beyond, below, and approximately parallel to the rod 18. Pivoted on the shank 38 is a movable carrier 40 which is held on the shank 38 by a collar 41 secured by a set screw. At the upper end of the carrier is an elongated boss 42 having a bore which is inclined at an acute angle to the rod 18. This angle is preferably about 13° but it may be adjusted slightly by loosening the bolt 31 and changing the approximate parallel alinement between the rod 18 and shank 38, after which the bolt 31 is retightened. (This adjustment affects the varying angle of the bevel ground upon the tool, as will be better understood later.) The bore serves as a bearing for the shank 44 of a spindle holder 46. This spindle holder is provided with a bore in which is mounted the shank 48 of a spindle 50. The bore for the shank 48 is offset at a slight angle to the bore for the shank 44 and in the present instance this offset is about 1° (as indicated in Fig. 2). The shank of the spindle is secured in the spindle holder by a nurled set screw 52, tapped in the spindle holder 46 and engaging the shank 48 of the spindle.

A nurled collar 60 is held on the rear end of the shank 44 of the spindle holder by a set screw 62. This collar is adjusted to prevent end play of the shank in its bore and its nurling provides manually operable means for rotating the same, together with the spindle and the grooving tool, which is mounted thereon in a manner to be described.

The machine shown is especially adapted for grinding grooving tools for use in the machine of the above-mentioned Knowlton patent, although the machine can readily be arranged to hold and operate upon other types of grooving tools.

A grooving tool for this use is shown at 70 and it is provided with a positioning extension 72 (Fig. 1) (such as shown at 344 in Fig. 16 of that patent). The bore of the tool fits over the spindle 50 and the extension 72 fits into a slot 74 in a locating plate 76 in order that the grooving tool may revolve, in an orbital path, with the spindle 50. The locating plate 76 is held on the spindle holder 46 by a mounting screw 78 and by positioning ledges on the holder.

The grooving tool 70, after being mounted on the spindle, is ground in the following manner: The movable carrier 40 is swung about the shank 38 toward the grinding wheel and the swinging is limited by a stop screw 90 which is threaded into the movable carrier. The stop screw is maintained frictionally in adjusted position by a coiled spring 92, which is placed over the screw, pressing against its head and the carrier. This screw stops the swinging of the carrier by abutting against the stop stud 34. In order to feed the tool to the grinding wheel, the stop screw 90 is backed off slowly as the nurled collar 60 is rotated a plurality of times, the feed of the carrier and rotation of the tool being stopped when sufficient stock has been ground from the end of the tool to provide a cutting edge completely around its perimeter, thus producing the sharpened grooving tool illustrated in Fig. 3.

Referring to Fig. 2, the obliquity obtained for the cutting edge is indicated by the dot-and-dash line A—A. The reason why the bevel of varying length and the oblique cutting edge are obtained is illustrated diagrammatically in Fig. 2. In this figure, the axis of the shank 44 of the spindle holder is shown at S and this diverges from the line W which is parallel to the axis of the grinding wheel, by the indicated angle of 13°. However, the center line of the grooving tool is indicated at G which diverges from the center line S by 1° as indicated. The lines S and G intersect at substantially the working face of the grinding wheel 14.

In the position shown in Fig. 2, it will be seen that the center line of the tool makes an angle of 13° minus 1°, or 12°, with the peripheral face of the wheel 14. In other words, the axis of the tool diverges from parallelism with the abrading face of the wheel by 12°. When the collar 60 is rotated so that the axis of the grooving tool is directly above or directly below the center line S, the angle is increased to 13° and when the the collar is rotated through 180° from the position shown, the angle made is 13° plus 1°, or 14°. Thus, it will be seen that the amount of divergence of the tool from parallelism with the abrading face of the wheel changes from 12° to 14° and this changes cyclically as the point of operation progresses completely around the tool. Accordingly, the center line of the grooving tool approaches and recedes from the grinding face of the wheel while the tool is revolved in a closed orbital path by rotating the collar 60 while the carrier 40 is in any fixed position. When the center line of the tool is brought nearest to parallelism with the grinding face of the wheel, that side of the tool being ground is ground back farthest from the outer end of the tool and vice versa, which causes the cutting edge to lie in the plane indicated by the line A—A. Furthermore, the length of the bevel changes throughout the perimeter of the cutting edge.

The invention has been described with the grinding being done on the peripheral face of the grinding wheel, but a grinding machine will operate equally well without departing from the spirit of the invention, if modified so as to utilize the radial face of such a wheel.

Having thus described my invention, what I claim as new and desire to secure by Letters Patent of the United States is:

1. A device for positioning and feeding a hollow, conical tool in grinding contact with an operating face of a grinding wheel to grind an oblique, beveled cutting edge thereon, said device having, in combination, a mounting for a tool, a pivoted carrier for guiding and moving the mounting toward said wheel to bring a tool revolved thereby into grinding contact with said face, adjustable means to limit the movement of the pivoted carrier, and means for revolving the mounting in a closed orbital path so that the axis of the tool makes an acute but continuously varying angle with the operating face of the wheel as the point of operation progresses completely around the tool.

2. In an apparatus for grinding a hollow, conical tool, a grinding wheel, a carrier loosely mounted for swinging movement toward and from the wheel about an axis approximately parallel to the operative face thereof, an adjustable stop arranged to limit accurately the approach of the carrier to the wheel, a spindle holder having a shank completely rotatable in the carrier about an axis at an acute angle to the face of the wheel, a spindle upon which a tool may be mounted, and means for maintaining the spindle in the holder at a slight angle to the axis of rotation of the holder.

JOSEPH C. CANTLEY.